June 21, 1966 — N. G. LIRONES — 3,256,574

MOLD AND METHOD OF FABRICATION

Filed March 22, 1965

INVENTOR
Nick G. Lirones
by McDougall, Hersh & Scott
Attys

United States Patent Office 3,256,574
Patented June 21, 1966

3,256,574
MOLD AND METHOD OF FABRICATION
Nick G. Lirones, North Muskegon, Mich., assignor to Howe Sound Company, New York, N.Y., a corporation of Delaware
Filed Mar. 22, 1965, Ser. No. 441,814
20 Claims. (Cl. 22—196)

This application is a continuation-in-part of my copending application Ser. No. 310,261, filed September 20, 1963.

This invention relates to the art of casting and to materials employed in the practice of same and it relates more particularly to a casting process and to compositions and methods for the preparation of the molds in the practice of same.

It is an object of this invention to produce and to provide a method for producing new and improved molds for use in the casing of various materials and it is a related object to provide a new and improved molding process employing the same and to provide compositions for use in the preparation of same.

More specifically, it is an object of this invention to produce a mold which is of sufficiently high strength and stability to enable materials to be poured directly therein for molding; in which reactive and refractory or other high melting point metals can be cast; in which metals can be formed in a manner to minimize oxidation thereby to enable the molding of metals that have heretofore been difficult to shape, and it is a related object to provide a new and improved molding process which can be easily carried out for the casting of materials which have heretofore not been easily adaptable to molding and in which the molded products can be easily and efficiently separated from the mold cleanly to release the molded product.

Figure 1:
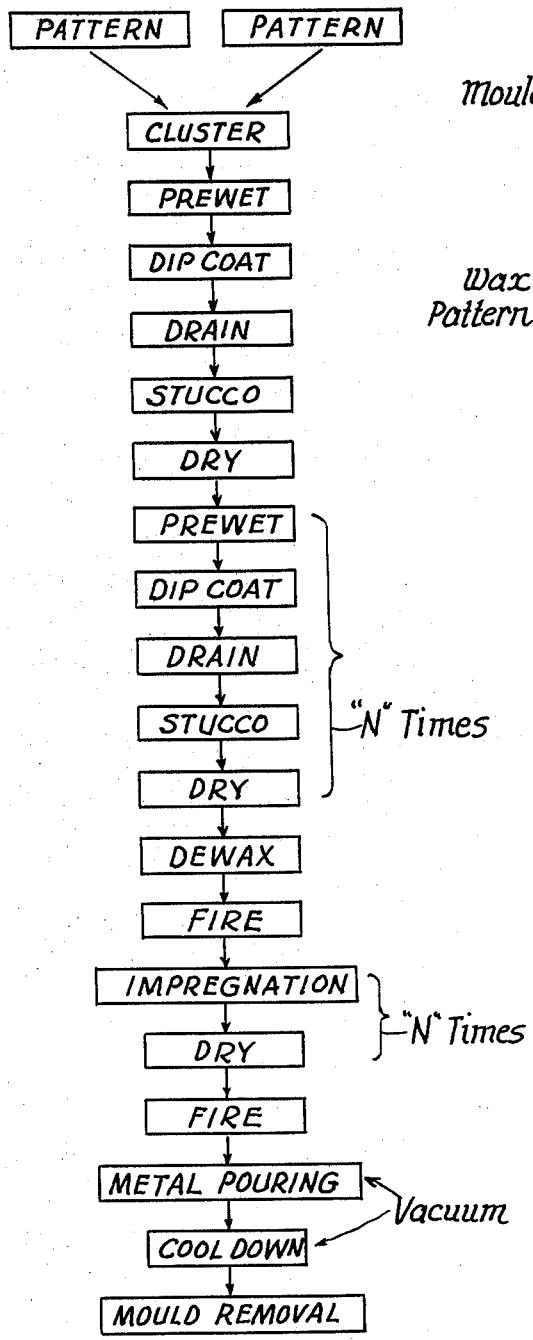
Figure 2:
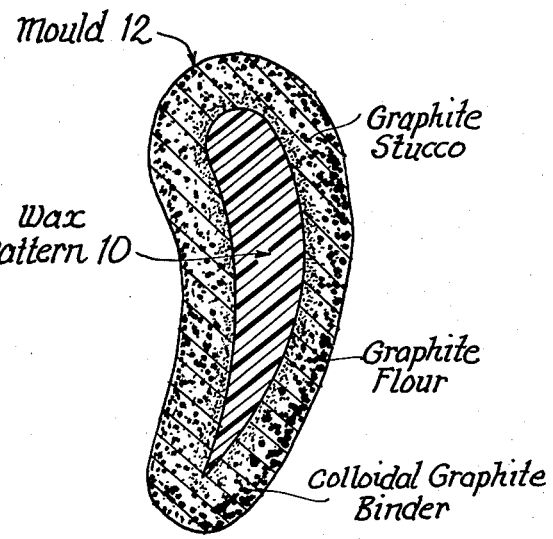
Figure 3:
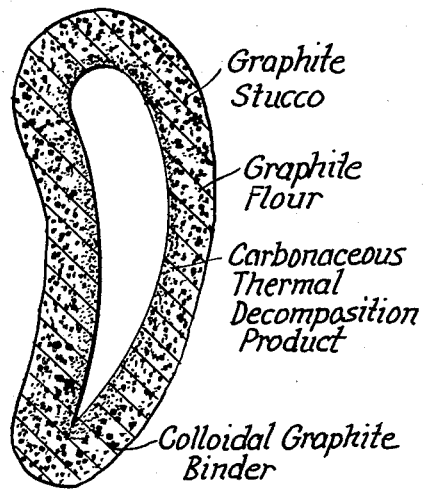

These and other objects and advantages of this invention will hereinafter appear and for purposes of illustration, but not of limitation, an embodiment of the invention is shown in the accompanying drawing in which FIG. 1 is a flow diagram of the process embodying the practice of this invention;

FIG. 2 is a schematic sectional view through a pattern having a mold formed thereon in accordance with the practice of this invention; and FIG. 3 is a schematic sectional view through the completed mold.

In accordance with the practice of this invention, at least the inner portions and preferably the entire cross-section of a mold is of graphitic material formed on the surface of a heat or otherwise disposable pattern by a series of integrated layers of dip coats and stucco coats but in which the essential solids of the dip coat composition and the stucco, including the binder, are all graphitic, as will hereinafter be described. A mold of such graphite material is substantially inert and non-oxidizing and is capable of use at considerably higher temperatures than other materials and many other new and novel characteristics are made available which enable use of the mold for the casing of refractory metals.

The new and novel mold will be described with reference to new and improved compositions employed in the fabrication of same and new and improved methods of manufacture.

In the following description, the terms "pattern" and "cluster" will be used interchangeably to refer to the wax or plastic pattern 10 or a cluster formed of a multiplicity of such individual patterns. Instead of wax, the patterns can be formed of other materials which can be removed by heat, solvent, chemical reaction or the like. It will be understood that changes may be made in the details of formulation, materials and methods employed without departing from the spirit of the invention.

EXAMPLE 1

*Preparation of wax pattern and cluster*

The pattern 10 is formed of conventional materials disposable by heat or chemicals, as in the well known investment casting processes. In the illustrated modification, the pattern is molded under pressure in suitable metal molds by injection of molten wax to fill the mold and set the pattern. Instead, the pattern can be formed of a thermoplastic, synthetic resinous material or combinations of such plastics and wax.

If the mold is to be formed about more than one pattern, the plurality of patterns are connected by runners for communication with a pouring spout to form a completed cluster. Where, as in the instant process, the cluster is to be repeatedly dipped into a slurry, it is desirable to provide a hanger rod for carrying the cluster and for suspending the cluster for drying and the like.

EXAMPLE 2

*Dip coat composition*

2.77 percent by weight solids of colloidal graphite (22% solids in aqueous medium, "Aquadag," of National Carbon Company)

37.8 percent by weight solids of graphite flour (less than 200 mesh)

0.174 percent by weight emulsifying agent (gum tragacanth)

0.003 percent by weight anionic wetting agent (sodium heptadecyl sulphate)

Remainder water

As the colloidal graphite, it is preferred to make use of colloidal particles of graphite of less than 1 micron. For the purpose of reducing cost, use can be made of a combination of such colloidal graphite mixed with up to 50 percent by weight and preferably up to only 30 percent by weight of semi-colloidal graphite having a particle size of between 1–20 microns.

The amount of colloidal graphite in the dip coat composition may vary but it is desirable to make use of an amount greater than 0.5 percent by weight but less than 5 percent by weight and preferably an amount within the range of 1 to 3.0 percent by weight. The amount of graphite flour can vary between 15–45 percent by weight of the dip coat composition and it is preferred to make use of an amount within the range of 20–30 percent by weight of the dip coat composition.

In the dip coat compositions represented by the above formulation, the emulsifying agents and the anionic wetting agents are preferred but not essential. Instead of gum tragacanth, use can be made of other hydrophilic colloids such as the gums, gelatins, alginates and the like, wherein, when used, such emulsifying agents are employed in an amount within the range of 0.01 to 0.5 percent by weight. Instead of the sodium heptadecyl sulphate wetting agent, other anionic surface active agents may be employed such as the alkyl sulphates and the alkyl aryl sulfonates and their salts. When employed, the amount of such surface active agent may range from 0.01 to 0.5 percent by weight of the compositon. The dip coat composition will have a pH within the range of 8.8 to 9.4.

The solids content, insofar as the colloidal or semicolloidal graphite and graphite flour is concerned, can be varied quite widely, it being necessary only to formulate for a viscosity that can be handled to coat the pattern and to make use of colloidal or semicolloidal graphite in an amount sufficient to achieve the desired bonding action. For this purpose, it is deemed sufficient if the latter is present in an amount to make up more than 1.5 percent by weight of the graphite solids of the dip coat composition and it is usually undesirable and uneconomical to make use of an amount of colloidal or semicolloidal graphite greater than 10 percent by weight of the graphite in the dip coat composition. It will be understood, however, that the essentially 100% graphite making up the solids in the dip coat compositon can be achieved by the use of colloidal or colloidal and semicolloidal graphite alone.

*Application of the dip coat composition*

The wax pattern or cluster is first inspected to remove dirt, flakes and other objects which may be adhered to the surfaces of the wax patterns and which, if allowed to remain, would impair the preparation of a good mold and lead to an imperfect casting. The cleaned cluster is immersed into the dip coat composition, while being stirred, to cover all of the surfaces of the cluster with the exception of the lip of the pouring spout. To promote the elimination of air pockets, it is desirable to rotate the cluster while immersing in the dip coat composition Instead of immersing the pattern in the stirred slurry of the dip coat composition for coverage of the surfaces of the pattern, the dip coat composition can be applied to achieve the desired coverage by spraying the dip coat composition onto the surfaces of the pattern. By this latter spraying technique the coating weight of the dip coat composition can be increased or decreased, as desired, by comparison with the amount of coating retained on the surfaces by immersion.

When fully coated, the pattern or cluster is suspended to drain excess dip coat composition. During drainage, the cluster can be inspected to detect air pockets which can be eliminated by addressing a stream of air onto the uncoated portions and thereafter allowing the slurry of the dip coat composition to flow onto the uncovered areas. While the cluster is being drained, it should be held in different planes designed to achieve uniform coating on all surfaces. In general, drainage should be completed within a few minutes but, in any event, in less time than would allow the coating to dry whereby the surface would not retain stucco in the desired uniform arrangement.

EXAMPLE 3

*Stuccoing*

After the cluster has been allowed to drain for a short time and while the surface is still wet with the dip coat composition, the surface is stuccoed with particles of graphite having the following particle size distribution:

| Tyler screen size: | Percent retained on screen |
|---|---|
| 65 | 62 |
| 100 | 29 |
| 150 | 7 |
| 200 | 1 |
| pan | 1 |

The graphite will hereinafter be referred to as having a particle size of more than 150 mesh but less than 35 mesh. The particles of graphite are caused to flow over the surface of the pattern until the wet surface is substantially completely covered.

*Application of stucco coat*

After the uniformity of coating has been achieved with the dip coat composition, the stucco is sprinkled onto the wet surface while constantly changing the position of the cluster substantially uniformly to cover the dip coating with a layer of stucco, while at the same time minimizing flow of the dip coat composition whereby non-uniformities might otherwise develop. In practice, the graphite particles are rained down from above through a screening member which is constantly fed from a vibratory conveyor. The particles of graphite adhere to the wet coating and become partially embedded therein to become integrated with the coating formed on the wax patterns. Instead of raining the graphite particles onto the wet surface, the particles of graphite can be formed into a fluidized bed into which the wet pattern is immersed.

If the dip coat composition is adjusted to enable gellation to take place within a very short period of time, the stuccoed cluster need not be set aside for drying. However, it is preferred to slow the gellation of the dip coat so that sufficient leeway is available for the desired drainage and stucco application. Thus it is desirable to provide for an air dry for a time ranging from 10–25 minutes. It will be understood that the drying time may be extended indefinitely beyond the times described without harm to the structure. If desired, drying of the combined coatings can be accelerated in a humidity controlled air circulating chamber heated to a temperature up to about 100° F.

The particle size of the graphite stucco is not critical since the particle size of the graphite can be varied over a fairly wide range. However, for best practice of this invention, it is preferred to make use of graphite having a particle size greater than 150 mesh and less than 20 mesh.

The operation is repeated, that is the pattern is again wet with the dip coat composition and covered with fine particles of graphite to build up a second composite layer. In the preferred practice of this invention, it is desired, though not essential, to precede the immersion of the coated pattern in the dip coat composition with a pre-wetting step in which the prewetting composition employs substantially the same formulation as the dip coat composition with the exception that a lower viscosity is employed, as occasioned by the formulation to include additional amounts of water sufficient to reduce the total solids to about 25–75% of the solids in the dip coat composition. Thus the coated pattern is first submerged in the prewet composition more completely to penetrate and wet out the coated surface followed almost immediately by submersion in the dip coat composition after which the steps of drainage, stuccoing with the fine particles of graphite, and drying are carried out. Thus the layers become better integrated one with the other to produce a strong and composite structure.

The steps of prewetting, if used, dip coating, stuccoing with the dry particles of graphite and drying can be repeated several times until a mold 12 of the desired thickness and strength has been built up about the disposable pattern or cluster.

While a mold of higher strength will be secured if the graphite particles of the type having a mesh size within the range of greater size than 150 but less than 20 are used throughout to build up the mold, it is preferred to make use of particles of graphite of larger dimension for use as the stucco after the second coat and preferably after the fifth coat. For such outer layers or coatings, graphite having the following particle size distribution may be employed:

| Tyler screen size: | Percent retained on screen |
|---|---|
| 8 | 1 |
| 10 | 14 |
| 20 | 65 |
| 35 | 18 |
| 65 | 1 |
| pan | 1 |

The foregoing will hereinafter be referred to as having a particle size greater than 35 mesh but less than 8 mesh.

A mold 12 having a wall thickness of from ¼ to ½ inch is usually sufficient for the coating of products of normal weight or dimension by molten metal casting, although molds of greater or lesser wall thickness can be formed depending on the weight or size of the casting being poured. The normal wall thickness of mold can be achieved with the compositions described with from 5–10 cycles of dip coating, stuccoing, and drying.

EXAMPLE 4

Dewaxing

After the composite mold has been produced, the disposable pattern is removed to leave a mold cavity in which the material to be molded may be cast. Pattern removal, hereinafter referred to as dewaxing, can be achieved in a number of ways:

(a) A new and novel concept in dewaxing graphite molds of the type described will hereinafter be referred to as "hot matrix dewaxing." For this purpose use is made of graphite chips preheated to an elevated temperature above the melting point temperature of the wax and preferably at least 200° F. above the melting point and more preferably to a temperature within the range of 400–800° F. The formed mold is positioned within a flask having open ends with the crucible facing downwardly in the flask. The preheated or hot graphite particles are introduced into the flask in an amount to surround the mold. Heat is supplied from the graphite sufficient to reduce the wax of the pattern to a state for flow gravitationally from the pouring spout of the mold while the hot graphite particles, which engulf the mold as a matrix, operate also to maintain a non-oxidizing atmosphere about the graphite mold. Without removal of the mold from the flask, the assembly can be heated up to a temperature for cure of the mold as to a temperature of 2300° F. or more without deterioration of the mold thereby to enable wax removal and curing to be accomplished in a single operation for complete removal of the wax pattern and cure of the mold in a fully protected atmosphere.

Other systems for dewaxing may be employed where dewaxing is carried out as a step separate and apart from cure, as illustrated by the following:

(b) Dewaxing can be carried out by a process referred to as "hot sand dewaxing" wherein sand heated to a temperature of 400–800° F. is arranged to surround the composite for intimate contact with the outer surfaces thereof whereby rapid heat transfer is achieved into the interior to melt out the wax. The hot sand can be poured about the mold or the mold can be buried in the hot sand. Instead of sand, use can be made of a metal or alloy system of low melting point such as the cerro alloys, low eutectic alloys, and the like.

(c) Dewaxing can be carried out with steam when the wax patterns are formed of a material having a melting point range below 200° F. For such purpose, the composite can be housed within a steam chamber or autoclave or else steam at relatively high pressure can be addressed onto the composite while it is suspended with the spout extending downwardly for drainage of the molten wax.

(d) Dewaxing can be carried out in an oven heated to a temperature above the melting point temperature of the wax but below the oxidizing temperature of the graphite, or preferably at a temperature within the range of 250–800° F. in a process referred to as "low temperature dewaxing," without the need to maintain a reducing atmosphere.

The mold is thereafter cured by heating to a temperature above 800° F. and preferably to a temperature within the range of 800–2300° F. Curing can be achieved by exposure of the mold to curing temperature for 15 or more minutes but it is preferred to cure the mold at a temperature within the range of 800–2300° F. for a time within the range of 15–120 minutes. Curing can be carried out concurrently with dewaxing when use is made of a high temperature dewaxing method as described in (a) above. Since graphite will be consumed when heated to a temperature above 800° F. in an oxidizing atmosphere, dewaxing and curing are carried out in an inert or non-oxidizing atmosphere. For this purpose, use can be made of vacuum conditions or an inert gas such as argon, nitrogen, or carbon monoxide.

The cured mold is cooled from curing temperature to a safe temperature below 800° F. before exposure to atmospheric conditions for continued cooling or for further processing.

Molds prepared in accordance with the practice of this invention are adapted to be employed for casting shaped products of such difficult to cast metals as zirconium, titanium, uranium, and the like reactive or refractory metals and alloys thereof, or tungsten, tantalum, columbium, and the like reactive heavy metals and alloys thereof, and more particularly metals within the Group IV of the periodic system of elements.

In the aforementioned copending application Ser. No. 310,261, description is made of a process for subsequent treatment of the cured mold to achieve densification at the interior face surrounding the mold cavity to reduce the absorbency of the mold and thereby inhibit infiltration or flow of the mold metal into the body of the mold whereby an unsatisfactory molded product is secured with the metals of the type previously described. For this purpose, the mold is impregnated with colloidal graphite formulated in an impregnating composition represented by the following:

EXAMPLE 5

Impregnating composition A 0.5 lb. colloidal graphite
11.5 lb. actone

Impregnating composition B 2 lb. colloidal graphite (22% solids in aqueous medium, less than 1 micron)
10 lb. distilled water
25 cc. anionic wetting agent For purposes of impregnation, only colloidal graphite of less than 1 micron should be used. Impregnation can be achieved merely by dipping the fired mold in the impregnating composition whereupon the composition soaks rapidly into the walls of the mold. Impregnation is followed by drying. As many as from 1 to 10 or more impregnations can be effected whereby the pores of the fired mold are increasingly filled with graphite by each impregnation. After one or a series of such impregnations, with intermittent drying, the mold should again be fired at a temperature within the range of 800–2300° F. in a reducing or inert atmosphere for about 15–120 minutes. The resultant product, upon cooling, will be found to be of such hardness and density as to give a metallic ring.

It has been found that the barrier achieved by impregnation with graphite in the manner described is often insufficient completely to block penetration of the described molten refractory metals into the surface portions of the mold where undesirable reactions can take place.

In accordance with the practice of this invention, the desired imperviousness to the molten metal cast into the mold can be achieved by impregnation of the mold with an organic polymeric, resinous, or colloid material which is subject to thermal decomposition in situ in the mold when heated to elevated temperature to deposit carbon or other carbonaceous thermal decompositions in situ in the mold and which is sufficiently inert and filling substantially to occupy the interstices between the graphite particles forming the wall portion of the mold to render the wall portion impervious to the flow of metal therethrough while permitting the release of vapors. For this purpose, the mold can be impregnated with one of the following compositions:

EXAMPLE 6

Phenyl-formaldehyde liquid resin (Catalin #136, Catalin Corporation of America) __ 1 part by volume.
Isopropyl alcohol (99%) _____ 1–10 parts by volume.

EXAMPLE 7

Phenolic Resin, water soluble (Catalin #8944, Catlin Corporation of America) _____ 1 part by volume.
Water _____ 1–10 parts by volume.

EXAMPLE 8

Furfuryl alcohol liquid resin (Durex #16470, Durex Plastic Div., Hooker Chemical Co.) _____ 95–99% by weight.
Accelerator 100 parts by weight Durex #17932 (a powdered phenol formaldehyde resin), 100 parts by weight of a solvent (such as acetone, methyl ethyl ketone, toluol or butyl alcohol) _____ 1–5% by weight.

EXAMPLE 9

Acrylic liquid resin (Armstrong T–321 resin, Armstrong Corporation) _____ 100%.

Impregnation can be achieved merely by dipping the fired mold in the impregnating composition whereupon the composition soaks into the walls of the mold. Alternatively, the impregnating composition can be poured into the mold cavity and held there for a time within the range of 15 seconds to 5 or more minutes to permit the material to soak into the walls of the mold. The liquid impregnating composition is then poured from the mold. After impregnation, the mold is air dried or dried at a temperature below 350° F. for up to 12 hours, depending on the mass of the mold being processed.

The mold is again heated at a temperature within the range of 1000–2300° F. for from 8–12 hours, under vacuum or non-oxidizing conditions, to effect thermal decomposition of the resin to form the carbonaceous material. Higher temperatures can be employed but it is believed that substantially complete conversion will be achieved by heating to within the temperature range described. Alternatively, the impregnated and dried mold may be re-impregnated and dried one or more times before heating to 1000–2300° F. to effect the desired mold density.

Instead of the illustrated phenol-formaldehyde resins, furfuryl alcohol resins, or acrylic resins, use can be made of others of the natural or synthetic organic resinous materials in corresponding dilutions or of such other high molecular weight organic materials as proteins, albumens, carbohydrates and the like which upon firing at elevated temperature reduce to form a stable form of graphite or other carbonaceous reduction product in the interstices of the mold walls.

To the present, description has been made of the process and compositions wherein a mold formed substantially entirely of graphite and carbon is produced. The description will hereafter be made to the use of the new and novel graphite mold of this invention in the fabrication of shaped products of refractory or heavy metals, such as titanium, zirconium, columbium, tantalum, and others of the Group IV–b metals.

The fired graphite mold possesses sufficient strength and has sufficient mass integrity to enable the molten metal to be poured into the mold.

While preheating is not essential, it is desirable to preheat the mold prior to metal pouring. When preheated to a temperature below about 800° F. it is not necessary to preheat in a reducing or inert atmosphere, but if the graphite mold is to be preheated to a temperature above 800° F., it is essential either to preheat under vacuum conditions or in an inert or non-oxidizing atmosphere, as in an atmosphere of Argon, nitrogen or carbon monoxide, otherwise graphite will burn when exposed to oxidizing conditions. Since titanium, zirconium, tungsten, uranium and the Group IV–b metals and alloys thereof have a melting point in excess of 800° F., it is desirable to carry out metal pouring by vacuum casting techniques wherein the graphite mold, with or without preheat, is enclosed within a vacuum chamber in communication with a metal melting furnace whereby a vacuum can be drawn in the chamber in which the mold is mounted to evacuate the chamber prior to metal pouring. The mold and the metal cast therein are preferably maintained under vacuum until the metal has solidified or the assembly has cooled to a temperature below 800° F. Thereafter, the assembly can be removed from the vacuum chamber for further processing. To assist filling of the molds under vacuum, centrifugal casting techniques can be utilized while at room temperature or at elevated temperature.

An important concept of this invention resides in the ability to fabricate castings of refractory metals and alloys of extremely high melting point or metals which are subject to rapid oxidation when at elevated temperature, as represented by such metals as zirconium, silicon, tantalum, titanium, and the like. This technological advance stems in part from the new and novel characteristics made available from a graphite mold of the type produced by the practice of this invention coupled with the means and method by which the molding process is carried out. Amongst many other desirable characteristics, the graphite mold embodies high temperature stability; high dimensional stability; a desirable balance of high strength and abrasion and hot metal erosion resistance, whereby the mold maintains shape during metal pouring at high temperature without so much strength as would cause tearing of the cast product responsive to differential shrinkage upon cooling; high heat conductivity for rapid cooling or controlled heat transfer for the development of best conditions in the metal poured; and the ability to maintain an inert or reducing atmosphere for the protection of the metal while in a molten or highly oxidizable state.

This phase of the invention will be described with reference to the molding of titanium, it being understood that others of the refractory or high melting point heavy metals or alloys subject to rapid oxidation at elevated temperatures may be similarly processed.

The graphite mold is transferred to the vacuum pouring furnace and the metal is poured under vacuum into the mold, with or without preheating of the mold. When preheating is employed, it is desirable to preheat the mold while under vacuum to inert the mold, but it is unnecessary to preheat to a temperature in excess of 800° F. although preheating to higher temperatures may be employed.

The poured metal is allowed to cool in the vacuum chamber to a temperature below that at which oxidation can take place before removal of the mold for exposure of the poured mold to the atmosphere for further cooling.

The cast metal produced can be removed by conventional techniques of impacting and shaking to break up the mold and to free the casting and by sand blasting to remove graphite retained on the surfaces of the casting.

It will be understood that changes may be made in the details of construction, arrangement and operation without departing from the spirit of the invention, especially as defined in the following claims.

I claim:
1. In the method of producing a mold for use in metal casting in which the mold is formed at least in the inner surfaces about the mold cavity of graphitic material consisting of graphite and graphite stucco, the improvement comprising the steps of impregnating the mold surfaces with a dilute fluid composition containing an organic resinous material which is reducible to a carbonaceous material upon thermal decomposition at elevated temperature, and then firing the mold in a non-oxidizing atmosphere to a temperature above decomposition temperature for the organic resinous material thermally to decompose the resin in situ in the impregnated mold.

2. The method as claimed in claim 1 which includes the step of maintaining the mold under vacuum during firing to provide the non-oxidizing atmosphere.

3. The method as claimed in claim 1 in which the non-oxidizing atmosphere is achieved by introduction of inert gas into the atmosphere surrounding the mold during firing.

4. The method as claimed in claim 1 in which the mold is impregnated by dipping the mold in the liquid composition containing the organic resinous material.

5. The method as claimed in claim 1 in which the organic resinous material is present in dilute solution in the impregnating composition.

6. The method as claimed in claim 1 in which the mold is impregnated by introducing the liquid composition into the mold cavity and then draining the liquid composition from the mold.

7. The method as claimed in claim 1 which includes the step of drying the mold after impregnation and before firing.

8. The method as claimed in claim 7 in which the steps of impregnating and intermediate drying are repeated a number of times for fuller impregnation of the mold with the resinous material.

9. The method as claimed in claim 1 in which the impregnated mold is heated to a temperature within the range of 1000–2300° F. for from 8 to 12 hours.

10. The method as claimed in claim 1 in which the impregnated mold is heated for firing to a temperature up to and beyond 2300° F.

11. In the method of producing a mold about a disposable pattern which is removed to define the mold cavity, the steps of wetting the surface of the pattern with an aqueous dip coat composition consisting essentially of the combination of graphite flour, colloidal graphite and water, covering the surface of the pattern while wet with the dip coat composition with a graphite stucco, repeating the application of dip coat composition and stucco for a number of cycles with intermediate drying until a mold of the desired wall thickness and strength sufficient to overcome cracking during dewaxing is produced about the pattern, removing the pattern, impregnating the mold with an organic resinous material in dilute solution in a liquid composition in which the organic resinous material is thermally decomposable at elevated temperature, drying the impregnated mold and then firing the mold at a temperature in excess of 800° F. in a non-oxidizing atmosphere to cure the mold and to effect thermal decomposition of the organic resinous material for decomposition in situ in the mold.

12. The method as claimed in claim 11 in which the mold is impregnated by dipping the mold into a liquid composition containing the organic resinous material.

13. The method as claimed in claim 11 in which the mold is impregnated by introducing the liquid composition containing the organic resinous material into the mold cavity and then draining the composition from the mold.

14. The method as claimed in claim 11 in which the mold is dried after impregnation and before firing and in which the steps of impregnation and drying are repeated a number of times before firing.

15. The method as claimed in claim 11 in which the impregnated mold is fired at a temperature above decomposition temperature up to and beyond 2300° F.

16. In the method of producing a mold about a disposable pattern which is removed to define the mold cavity, the steps of wetting the surfaces of the pattern with an aqueous dip coat composition consisting essentially of the combination of graphite flour, colloidal graphite and water, covering the surface of the pattern wet with the dip coat composition with a graphite stucco, repeating the application of dip coat composition and stucco for a number of cycles with intermediate drying until a mold of the desired wall thickness and with strengths sufficient to overcome cracking during dewaxing is produced about the pattern, removing the pattern, curing the mold by heating to a temperature in excess of 800° F. in a non-oxidizing atmosphere, impregnating the mold with a liquid system containing a small amount of an organic high molecular weight material which is thermally decomposable at elevated temperature to a stable carbonaceous thermal decomposition product, drying the impregnated mold, and then firing the mold at an elevated temperature sufficient to effect thermal decomposition of the organic material for decomposition thereof in situ in the mold.

17. The method as claimed in claim 16 in which the organic high molecular weight material is a protein.

18. The method as claimed in claim 16 in which the organic high molecular weight material is a carbohydrate.

19. The method as claimed in claim 16 in which the organic high molecular weight material is an albumen.

20. The method as claimed in claim 16 in which the organic high molecular weight material is a phenol-aldehyde resin.

References Cited by the Examiner
UNITED STATES PATENTS

| | | | |
|---|---|---|---|
| 2,564,308 | 8/1951 | Nagle | 22—192 |
| 2,886,869 | 5/1959 | Webb et al. | |
| 3,005,244 | 10/1961 | Erdle et al. | |
| 3,010,852 | 11/1961 | Prange et al. | 22—196 |
| 3,153,825 | 10/1964 | Crocker | 22—192 |
| 3,153,826 | 10/1964 | Horton. | |

MARCUS U. LYONS, *Primary Examiner.*

J. SPENCER OVERHOLSER, *Examiner.*